(12) United States Patent
Yoneda et al.

(10) Patent No.: US 11,437,622 B2
(45) Date of Patent: Sep. 6, 2022

(54) SECONDARY BATTERY, GRAPHENE OXIDE, AND MANUFACTURING METHOD THEREOF

(71) Applicant: SEMICONDUCTOR ENERGY LABORATORY CO., LTD., Atsugi (JP)

(72) Inventors: Yumiko Yoneda, Kanagawa (JP); Teppei Oguni, Kanagawa (JP); Takuya Miwa, Mie (JP); Masaki Yamakaji, Kyoto (JP); Ayae Tsuruta, Kanagawa (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 0 days.

(21) Appl. No.: 17/184,074

(22) Filed: Feb. 24, 2021

(65) Prior Publication Data
US 2021/0202945 A1 Jul. 1, 2021

Related U.S. Application Data

(63) Continuation of application No. 16/454,116, filed on Jun. 27, 2019, now Pat. No. 10,944,110, which is a (Continued)

(30) Foreign Application Priority Data

Dec. 24, 2015 (JP) .................................. 2015-250970

(51) Int. Cl.
*H01M 4/587* (2010.01)
*H01M 4/62* (2006.01)
(Continued)

(52) U.S. Cl.
CPC .......... *H01M 4/587* (2013.01); *C01B 32/225* (2017.08); *C01B 32/23* (2017.08); *H01M 4/0404* (2013.01);
(Continued)

(58) Field of Classification Search
None
See application file for complete search history.

(56) References Cited

U.S. PATENT DOCUMENTS 8,652,687 B2 2/2014 Zhamu et al.
9,293,770 B2 3/2016 Todoriki et al.
(Continued)

FOREIGN PATENT DOCUMENTS

JP 10-012241 A 1/1998
JP 2004-182593 A 7/2004
(Continued)

*Primary Examiner* — Christopher P Domone
(74) *Attorney, Agent, or Firm* — Nixon Peabody LLP; Jeffrey L. Costellia

(57) ABSTRACT

To provide a manufacturing method of graphene oxide that allows mass production through a relatively simple process, at low costs, and with safety and efficiency. A hydrogen peroxide solution, sulfuric acid, and flake graphite are put in a reaction container, and the mixture is stirred to obtain expansion graphite. The synthesized expansion graphite is washed not with pure water but with a saturated aqueous solution of magnesium sulfate ($MgSO_4$) or an organic solvent, whereby a large amount of sulfuric acid is contained between graphite layers. The expansion graphite is subjected to heat treatment or microwave irradiation to form expanded graphite, and a graphite layer is peeled by ultrasonic treatment and then oxidized to form a graphene compound.

16 Claims, 9 Drawing Sheets

US 11,437,622 B2
Page 2

Related U.S. Application Data continuation of application No. 15/381,152, filed on Dec. 16, 2016, now Pat. No. 10,381,646.

(51) Int. Cl.

| | | |
|---|---|---|
| *C01B 32/225* | (2017.01) | |
| *C01B 32/23* | (2017.01) | |
| *H01M 50/44* | (2021.01) | |
| *H01M 50/46* | (2021.01) | |
| *H01M 50/403* | (2021.01) | |
| *H01M 50/411* | (2021.01) | |
| *H01M 50/429* | (2021.01) | |
| *H01M 4/04* | (2006.01) | |
| *H01M 4/1393* | (2010.01) | |
| *H01M 4/36* | (2006.01) | |
| *H01M 10/0525* | (2010.01) | |
| *H01M 10/0587* | (2010.01) | |
| *H01M 10/052* | (2010.01) | |
| *H01M 4/133* | (2010.01) | |
| *H01M 4/02* | (2006.01) | |

(52) U.S. Cl.
CPC ......... *H01M 4/1393* (2013.01); *H01M 4/364* (2013.01); *H01M 4/625* (2013.01); *H01M 10/0525* (2013.01); *H01M 10/0587* (2013.01); *H01M 50/403* (2021.01); *H01M 50/411* (2021.01); *H01M 50/4295* (2021.01); *H01M 50/44* (2021.01); *H01M 50/46* (2021.01); *C01P 2006/40* (2013.01); *H01M 4/133* (2013.01); *H01M 10/052* (2013.01); *H01M 2004/027* (2013.01); *H01M 2220/20* (2013.01)

(56) References Cited

U.S. PATENT DOCUMENTS

| | | | |
|---|---|---|---|
| 10,381,646 | B2 | 8/2019 | Yoneda et al. |
| 10,529,977 | B2 | 1/2020 | Ikenuma et al. |
| 11,251,415 | B2 | 2/2022 | Ikenuma et al. |
| 2004/0166049 | A1 | 8/2004 | Reinheimer et al. |
| 2011/0049437 | A1* | 3/2011 | Crain .................. C09D 7/70 977/734 |
| 2013/0052547 | A1 | 2/2013 | Ogino et al. |
| 2013/0156678 | A1* | 6/2013 | Banerjee ............... H01G 11/36 204/507 |
| 2013/0273428 | A1 | 10/2013 | Kawakami et al. |
| 2016/0118689 | A1 | 4/2016 | Oguni et al. |
| 2016/0149279 | A1 | 5/2016 | Ogino et al. |
| 2016/0204440 | A1 | 7/2016 | Todoriki et al. |
| 2016/0329533 | A1 | 11/2016 | Tajima |
| 2017/0050856 | A1 | 2/2017 | Ming et al. |
| 2022/0158169 | A1 | 5/2022 | Ikenuma et al. |

FOREIGN PATENT DOCUMENTS

| | | |
|---|---|---|
| JP | 2011-032156 A | 2/2011 |
| JP | 2012-131691 A | 7/2012 |
| JP | 2013-516037 | 5/2013 |
| JP | 2015-038017 A | 2/2015 |
| JP | 2016-048684 A | 4/2016 |
| WO | WO-2009/013931 | 1/2009 |
| WO | WO-2011/079238 | 6/2011 |
| WO | WO-2016/030811 | 3/2016 |

\* cited by examiner

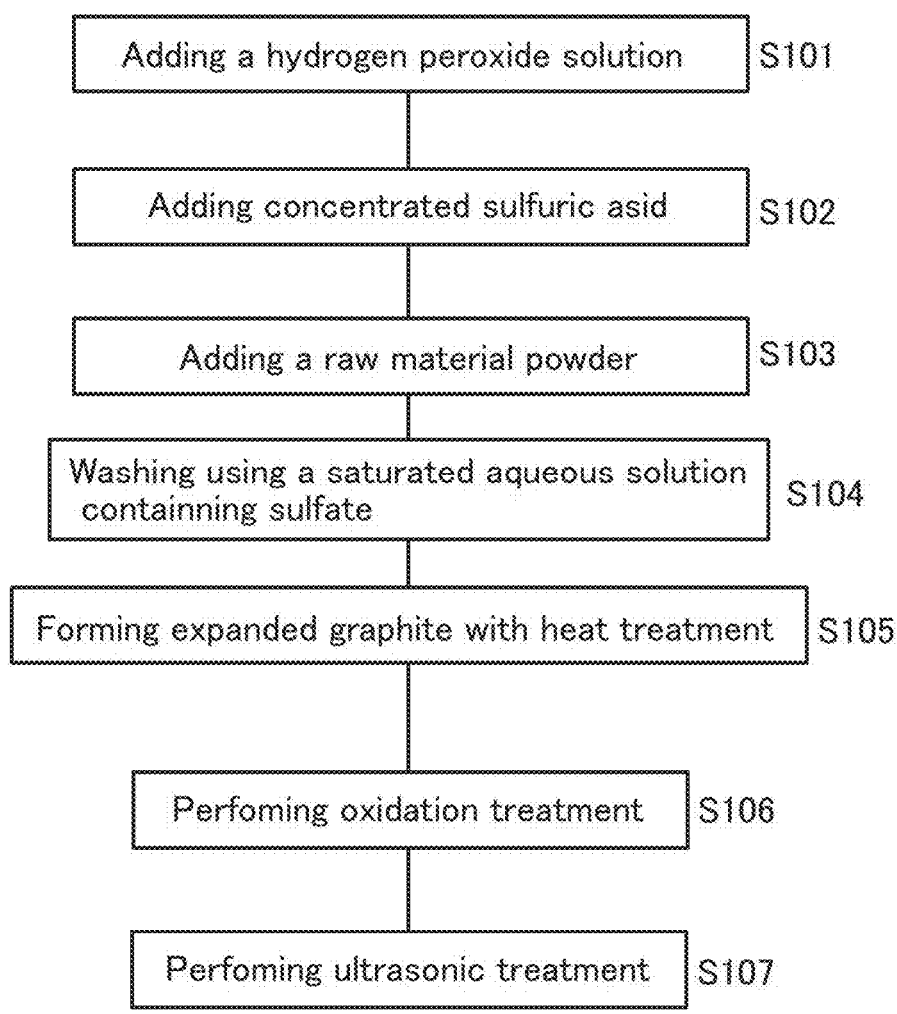

Charging

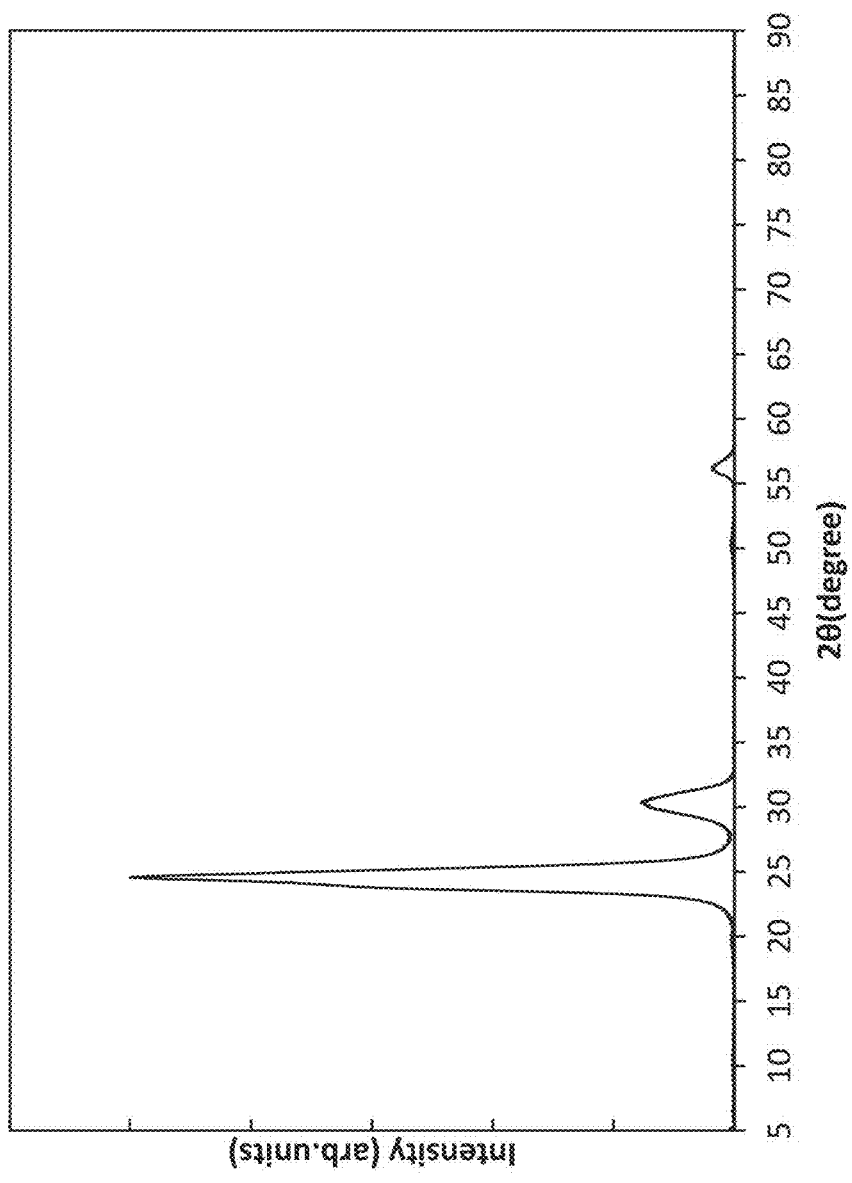

SECONDARY BATTERY, GRAPHENE OXIDE, AND MANUFACTURING METHOD THEREOF

BACKGROUND OF THE INVENTION

1. Field of the Invention

One embodiment of the present invention relates to a manufacturing method of graphene oxide. Another embodiment of the present invention relates to a secondary battery including graphene oxide and a manufacturing method thereof. Another embodiment of the present invention relates to a semiconductor device including a secondary battery.

Note that in this specification, a semiconductor device refers to any device that can function by utilizing semiconductor characteristics. An electro-optical device, a semiconductor circuit, and an electronic device are all semiconductor devices.

2. Description of the Related Art

With the downsizing of semiconductor devices, materials with high electrical conductivity and thermal conductivity have been required. Examples of the materials include graphene and graphene oxide. Recent research has been actively conducted on the use of carbon-based materials such as graphene and graphene oxide for components of batteries (lithium-ion secondary batteries and capacitors).

Graphene is a material having high strength, electrical conductivity, thermal conductivity, and heat resistance. Graphene is a single atomic layer consisting of six-membered carbon rings. Graphite is stacked layers of graphene.

Graphene oxide is obtained by Hummers' method (graphite is oxidized through the addition of concentrated sulfuric acid, sodium nitrate, and potassium permanganate), or modified Hummers' method (through the addition of $KMnO_4$ to a mixture of concentrated sulfuric acid, phosphoric acid, and graphite). Commercially available graphene oxide, which is fabricated not by Hummers' method producing toxic gases but by modified Hummers' method or the like, is highly expensive.

Patent Document 1 discloses a method to obtain expansion graphite.

REFERENCE

Patent Document

[Patent Document 1] Japanese Published Patent Application No. 2012-131691

SUMMARY OF THE INVENTION

One embodiment of the present invention provides a manufacturing method of graphene oxide that allows mass production through a relatively simple process, at low costs, and with safety and efficiency.

Another embodiment of the present invention provides an application of graphene oxide to part of a secondary battery.

Graphene oxide can be obtained at low costs by using graphite or expansion graphite as a raw material and performing heating in an oxygen-containing atmosphere.

Expansion graphite refers to graphite intercalation compounds (GTC) where intercalant such as sulfuric acid is inserted between graphite layers. In this specification, a substance resulting from gas release from expansion graphite by heat treatment, microwave irradiation, or the like is referred to as expanded graphite.

Note that it is difficult to peel a thin graphite layer from graphite or expansion graphite. For example, a thin graphite layer cannot be easily obtained from commercially available expansion graphite, which contains a small amount of sulfuric acid and thus a small number of graphite layers where sulfuric acid is inserted. This causes a resulting graphite layer to have a large thickness.

In addition, when synthesized expansion graphite is washed with pure water so that sulfuric acid is washed away, sulfuric acid interposed between graphite layers is released at the same time.

A structure of a manufacturing method of the present invention is a method for manufacturing expansion graphite by the steps of inserting sulfuric acid between graphite layers and performing washing with an aqueous solution containing sulfate or an organic solvent.

For example, a hydrogen peroxide solution, sulfuric acid, and flake graphite are put in a reaction container, and the mixture is stirred to obtain expansion graphite. The synthesized expansion graphite is washed not with pure water but with a saturated aqueous solution of magnesium sulfate ($MgSO_4$) or a specific organic solvent. Thus, a large amount of sulfuric acid can be contained between graphite layers. Instead of magnesium sulfate, sulfate such as potassium sulfate ($K_2SO_4$) or titanium sulfate ($Ti(SO_4)_2$) may be used. An example of the specific organic solvent is γ-butyrolactone.

The above structure can be a novel method for manufacturing expansion graphite. When water is dropped into sulfuric acid, the water is boiled so that sulfuric acid is scattered from the dropping point and the periphery thereof. This phenomenon does not occur in the case where a saturated aqueous solution of magnesium sulfate or a specific organic solvent is used, which is advantageous in that a manufacturer performs the process safely.

A novel method for manufacturing a graphene compound can be obtained in the following manner. The expansion graphite that has been obtained by the novel manufacturing method of expansion graphite is subjected to heat treatment or microwave irradiation to form expanded graphite, and a graphite layer is peeled by ultrasonic treatment and then oxidized to form a graphene compound.

Another novel method for manufacturing a graphene compound can also be obtained in the following manner. The expansion graphite that has been obtained by the novel manufacturing method of expansion graphite is subjected to heat treatment or microwave irradiation to form expanded graphite, and then oxidized and graphene oxide is formed by ultrasonic treatment.

The peeling is not necessarily performed by ultrasonic treatment and may be performed in any step of applying a peeling force to expanded graphite, such as a heating step or a mechanical peeling step.

The aforementioned ultrasonic treatment preferably includes at least a step of performing ultrasonic treatment at greater than or equal to 25 kHz and less than or equal to 40 kHz, in which case a thin graphite layer can be peeled. After the ultrasonic treatment, drying may be performed by mixture and dispersion treatment using a highly dispersive device such as a bead mill, a roll mill, or FILMIX (registered trademark).

The manufacturing methods of expansion graphite and a graphene compound disclosed in this specification, which have simple processes, consume low energy and are produced at low costs and with low environmental load, i.e., suitable for industrial production.

Note that in one embodiment of the present invention, a graphene compound can be used in a component of a power storage device. As described later, when modification is performed, the structure and characteristics of a graphene compound can be selected from a wider range of alternatives. Thus, a preferable property can be exhibited in accordance with a component in which a graphene compound is to be used. Moreover, a graphene compound has a high mechanical strength and therefore can be used in a component of a flexible power storage device.

A graphene compound obtained by any of the above novel manufacturing methods of a graphene compound is mixed with an active material to form a paste, the paste is applied on a current collector to form a first electrode, and the first electrode overlaps with a second electrode with a separator positioned therebetween, whereby a secondary battery can be formed.

Another structure of the manufacturing method of the present invention is a method for manufacturing a secondary battery by the steps of inserting sulfuric acid between graphite layers, performing washing with an aqueous solution containing sulfate or an organic solvent, performing heating to form expanded graphite, performing ultrasonic treatment to form a peeled graphite layer, performing oxidation before or after the ultrasonic treatment to form a graphene compound, mixing the oxidized graphene compound with an active material to form a paste, applying the paste on a current collector to form a first electrode, and overlapping the first electrode and a second electrode with a separator positioned therebetween.

Graphene compounds will be described below.

Graphene has carbon atoms arranged in one atomic layer. A π bond exists between the carbon atoms. Graphene including two or more and one hundred or less layers is referred to as multilayer graphene in some cases. The length in the longitudinal direction or the length of the major axis in a plane in each of graphene and multilayer graphene is greater than or equal to 50 nm and less than or equal to 100 µm or greater than or equal to 800 nm and less than or equal to 50 µm.

In this specification and the like, a compound including graphene or multilayer graphene as a basic skeleton is referred to as a graphene compound. Graphene compounds include graphene and multilayer graphene.

Graphene compounds are detailed below.

A graphene compound is a compound where graphene or multilayer graphene is modified with an atom other than carbon or an atomic group with an atom other than carbon. A graphene compound may be a compound where graphene or multilayer graphene is modified with an atomic group composed mainly of carbon, such as an alkyl group or an alkylene group. An atomic group that modifies graphene or multilayer graphene is referred to as a substituent, a functional group, a characteristic group, or the like in some cases. Modification in this specification and the like refers to introduction of an atom other than carbon, an atomic group with an atom other than carbon, or an atomic group composed mainly of carbon to graphene, multilayer graphene, a graphene compound, or graphene oxide (described later) by a substitution reaction, an addition reaction, or other reactions.

Note that the front surface and the back surface of graphene may be modified with different atoms or atomic groups. In multilayer graphene, multiple layers may be modified with different atoms or atomic groups.

An example of the above-described graphene modified with an atom or an atomic group is graphene or multilayer graphene that is modified with oxygen or a functional group containing oxygen. Examples of the functional group containing oxygen include an epoxy group, a carbonyl group such as a carboxyl group, and a hydroxyl group. A graphene compound modified with oxygen or a functional group containing oxygen is referred to as graphene oxide in some cases. In this specification, graphene oxides include multilayer graphene oxides.

A formation method example of graphene oxide is described below. Graphene oxide can be obtained by oxidizing the aforementioned graphene or multilayer graphene. Alternatively, graphene oxide can be obtained by being separated from graphite oxide. Graphite oxide can be obtained by oxidizing graphite. The graphene oxide may be further modified with the above-mentioned atom or atomic group.

A compound that can be obtained by reducing graphene oxide is referred to as reduced graphene oxide (RGO) in some cases. In RGO, in some cases, all oxygen atoms contained in the graphene oxide are not extracted and part of them remains in a state of oxygen or an atomic group containing oxygen that is bonded to carbon. In some cases, RGO includes a functional group, e.g., an epoxy group, a carbonyl group such as a carboxyl group, or a hydroxyl group.

A graphene compound may have a sheet-like shape where a plurality of graphene compounds partly overlap each other. Such a graphene compound is referred to as a graphene compound sheet in some cases. The graphene compound sheet has, for example, an area with a thickness larger than or equal to 0.33 nm and smaller than or equal to 10 mm, preferably larger than 0.34 nm and smaller than or equal to 10 µm. The graphene compound sheet may be modified with an atom other than carbon, an atomic group containing an atom other than carbon, an atomic group composed mainly of carbon such as an alkyl group, or the like. A plurality of layers in the graphene compound sheet may be modified with different atoms or atomic groups.

A graphene compound may have a five-membered ring composed of carbon atoms or a poly-membered ring that is a seven- or more-membered ring composed of carbon atoms, in addition to a six-membered ring composed of carbon atoms. In the neighborhood of a poly-membered ring which is a seven- or more-membered ring, a region through which a lithium ion can pass may be generated.

A plurality of graphene compounds may be gathered to form a sheet-like shape

A graphene compound has a planar shape, thereby enabling surface contact.

In some cases, a graphene compound has high conductivity even when it is thin. The contact area between graphene compounds or between a graphene compound and an active material can be increased by surface contact. Thus, even with a small amount of a graphene compound per volume, a conductive path can be formed efficiently.

In contrast, a graphene compound may also be used as an insulator. For example, a graphene compound sheet can be used as a sheet-like insulator. Graphene oxide, for example, has a higher insulation property than a graphene compound that is not oxidized, in some cases. A graphene compound modified with an atomic group may have an improved insulation property, depending on the type of the modifying atomic group.

A graphene compound in this specification and the like may include a precursor of graphene. The precursor of graphene refers to a substance used for forming graphene. The precursor of graphene may contain the above-described graphene oxide, graphite oxide, or the like.

Graphene containing an alkali metal or graphene containing an element other than carbon, such as oxygen, is referred to as a graphene analog in some cases. In this specification and the like, graphene compounds include graphene analogs.

A graphene compound in this specification and the like may include an atom, an atomic group, and ions of them between the layers. The physical properties, such as electric conductivity and ion conductivity, of a graphene compound sometimes change when an atom, an atomic group, and ions of them exist between layers of the compound. In addition, a distance between the layers is increased in some cases.

A graphene compound has excellent electrical characteristics of high conductivity and excellent physical properties of high flexibility and high mechanical strength in some cases. A modified graphene compound can have an extremely low conductivity and serve as an insulator depending on the type of the modification. A graphene compound has a planar shape A graphene compound enables low-resistance surface contact.

A large amount of graphene oxide can be manufactured safely from graphite or expansion graphite. In addition, the manufacturing costs can be reduced so that secondary batteries using graphene oxide come into widespread use. Furthermore, the reduced manufacturing costs contribute to the widespread use of electronic devices including secondary batteries whose positive electrodes use graphene oxide.

BRIEF DESCRIPTION OF THE DRAWINGS

In the accompanying drawings:

FIG. 1 shows an example of a manufacturing flow of one embodiment of the present invention;

FIG. 9 is a graph showing XRD measurement results.

DETAILED DESCRIPTION OF THE INVENTION

Figure 2A:
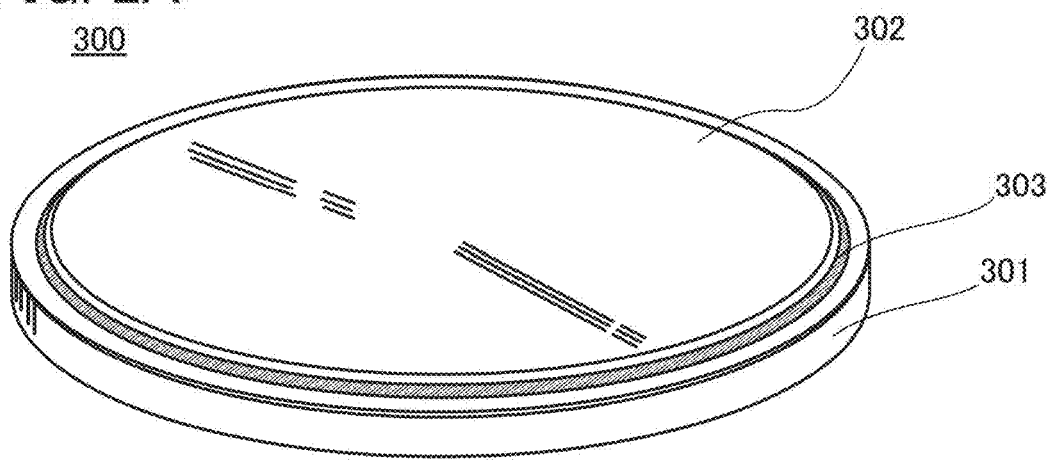
FIGS. 2A to 2C illustrate a coin-type storage battery.

Hereinafter, embodiments of the present invention will be described in detail with reference to the accompanying drawings. Note that the present invention is not limited to the description below, and it is easily understood by those skilled in the art that modes and details of the present invention can be modified in various ways. In addition, the present invention should not be construed as being limited to the description in the embodiments given below.

Embodiment 1

FIG. 1 shows a manufacturing flow example. Prepared first is a mixed solution in which a hydrogen peroxide solution ($H_2O_2$) and concentrated sulfuric acid are sequentially added and mixed in a container (S101, S102).

Then, as a raw material powder, a powder of natural graphite or a powder of artificial graphite is prepared.

Subsequently, the natural or artificial graphite powder is added to the mixed solution in which the hydrogen peroxide solution and concentrated sulfuric acid have been sequentially mixed in the container (S103). The reaction among the graphite powder, the hydrogen peroxide solution, and concentrated sulfuric acid may be performed in an air atmosphere or an inert gas atmosphere of argon, nitrogen, or the like. The reaction time among the graphite powder, the hydrogen peroxide solution, and concentrated sulfuric acid is longer than or equal to 30 minutes and shorter than or equal to 48 hours, and the reaction temperature is higher than or equal to 0° C. and lower than or equal to 50° C. A low concentration of the hydrogen peroxide solution causes sulfuric acid between graphite layers to flow out, thereby preventing a desired amount of sulfuric acid from being maintained. Thus, the concentration of hydrogen peroxide in the hydrogen peroxide solution is set to greater than or equal to 20 wt % and less than or equal to 40 wt %. The reaction between the graphite powder and the hydrogen peroxide solution enables a hydroxyl group to be introduced into graphite. Then, expansion graphite in which sulfuric acid (or a sulfuric acid ion) is inserted between graphite layers is produced.

Next, washing is performed using an aqueous solution containing sulfate (S104), and then, drying is performed. The use of the aqueous solution containing sulfate is preferable because sulfuric acid between graphite layers can be prevented from flowing out Examples of the aqueous solution containing sulfate include an aqueous solution of magnesium sulfate, an aqueous solution of potassium sulfate, and an aqueous solution of titanium sulfate. More preferably, a saturated aqueous solution of sulfuric acid is used in order to further prevent the flow out of sulfuric acid. For example, a saturated aqueous solution of magnesium sulfate, a saturated aqueous solution of potassium sulfate, or a saturated aqueous solution of titanium sulfate can be used. An organic solvent may be used instead of the aqueous solution containing sulfate. The use of the organic solvent prevents the reduction of graphite that has been oxidized in washing. As the organic solvent, for example, γ-butyrolactone can be used.

Subsequently, heat treatment is performed in an air atmosphere at higher than or equal to 120° C. and lower than or equal to 1050° C. for longer than or equal to 1 minute and shorter than or equal to 24 hours (S105). The heat treatment at higher than or equal to 120° C. gasifies sulfuric acid in graphite and makes a space between the graphite layers. The space expands to produce expanded graphite. The heat treatment for obtaining expanded graphite may be microwave irradiation with a microwave oven or the like.

Then, oxidation treatment is performed by heat treatment in an oxygen atmosphere (S106). The heat treatment in an oxygen atmosphere is performed at higher than or equal to 150° C. and lower than or equal to 1000° C. for longer than or equal to 30 minutes and shorter than or equal to 24 hours.

Next, ultrasonic treatment for peeling is performed (S107). Mechanical peeling treatment may be performed instead of the ultrasonic treatment.

The ultrasonic treatment is performed at greater than or equal to 25 kHz and less than or equal to 40 kHz in a dispersion medium such as ethanol or N-methylpyrrolidone (NMP). The irradiation time of ultrasonic treatment in the dispersion medium is, but not particularly limited to, longer than or equal to 5 minutes and shorter than or equal to 2 hours.

Note that for easy dispersion in the dispersion medium, graphite may be modified with a functional group at low costs.

In the case where mechanical peeling treatment is performed, FILMIX (registered trademark) may be employed. Ultrasonic treatment and mechanical peeling treatment may be alternately performed for peeling.

Peeling may be performed by filtration, extraction, washing, drying, separation and purification such as centrifugation, or a combination of any of them.

In the case where the peeled thin graphite layer needs to be oxidized, heat treatment may be further performed in an oxygen atmosphere. Through the above steps, graphene oxide can be manufactured at low costs.

The use of such graphene oxide for a positive electrode material or the like reduces the total production costs of secondary batteries.

Embodiment 2

In this embodiment, the structure of a storage battery including graphene oxide formed by the method described in Embodiment 1 as a conductive additive will be described with reference to FIGS. 2A to 4B.

Figure 2B:
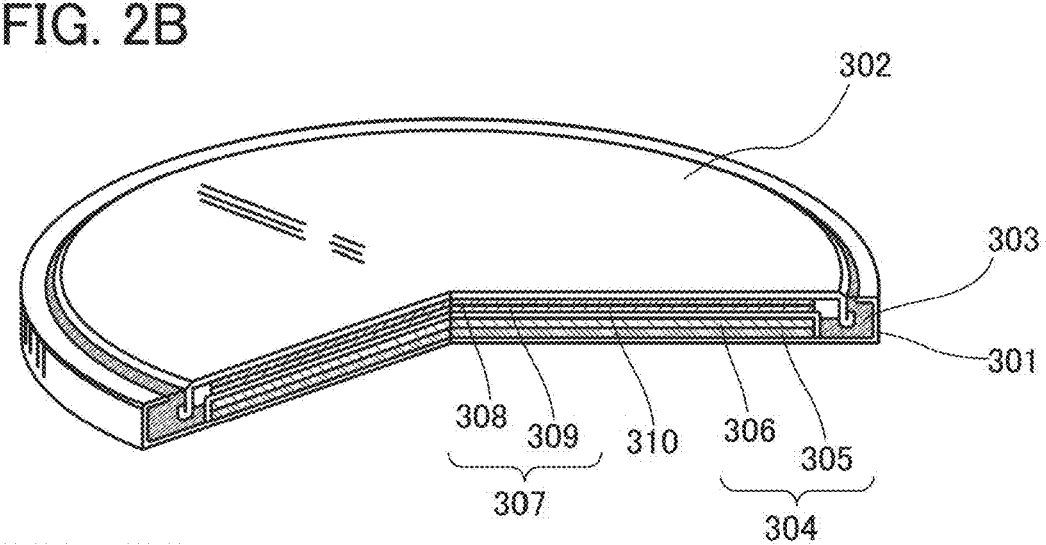

FIG. 2A is an external view of a coin-type (single-layer flat type) storage battery, and FIG. 2B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing the adhesion of positive electrode active materials, a conductive additive for increasing the conductivity of the positive electrode active material layer, and the like in addition to the active materials. As the conductive additive, a material that has a large specific surface area is preferably used; for example, acetylene black (AB) can be used. Alternatively, a carbon material such as a carbon nanotube, graphene, or fullerene can be used.

A negative electrode 307 includes a negative electrode current collector 308 and a negative electrode active material layer 309 provided in contact with the negative electrode current collector 308. The negative electrode active material layer 309 may further include a binder for increasing the adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309.

A material with which lithium can be dissolved and precipitated or a material into and from which lithium ions can be inserted and extracted can be used for the negative electrode active materials used for the negative electrode active material layer 309; for example, a lithium metal, a carbon-based material, and an alloy-based material can be used. The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, and carbon black.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (e.g., 0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low costs, and safety greater than that of a lithium metal.

For the negative electrode active materials, an alloy-based material that enables charge-discharge reactions by an alloying reaction and a dealloying reaction with lithium metal can be used. In the case where carrier ions are lithium ions, a material containing at least one of Ga, Al, Si, Ge, Sn, Pb, Sb, Bi, Ag, Au, Zn, Cd, In, and the like can be used for example. Such elements have higher capacity than carbon. In particular, silicon has a significantly high theoretical capacity of 4200 mAh/g. For this reason, silicon is preferably used for the negative electrode active materials. Examples of the alloy-based material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn. Here, SiO refers to a material that contains silicon at higher proportion than $SiO_2$ does.

Alternatively, for the negative electrode active materials, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active materials, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm).

A nitride containing lithium and a transition metal is preferably used, in which case lithium ions are contained in the negative electrode active materials and thus the negative electrode active materials can be used in combination with a positive electrode active material that does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material that causes a conversion reaction can be used for the negative electrode active materials; for example, a transition metal oxide which does not cause an alloy reaction with lithium, such as cobalt oxide (CoO), nickel oxide (NiO), or iron oxide (FeO), may be used. Other examples of the material that causes a conversion reaction include oxides such as $Fe_2O_3$, CuO, $Cu_2$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The current collectors 305 and 308 can each be formed using a highly conductive material which is not alloyed with a carrier ion of, for example, lithium, such as a metal typified by stainless steel, gold, platinum, zinc, iron, nickel, copper, aluminum, titanium, and tantalum or an alloy thereof. Alternatively, an aluminum alloy to which an element that improves heat resistance, such as silicon, titanium, neodymium, scandium, or molybdenum, is added can be used. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, and nickel. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness greater than or equal to 5 μm and less than or equal to 30 μm.

The positive electrode active materials described in Embodiment 1 can be used for the positive electrode active material layer 306.

The separator 310 can be formed using an insulator such as cellulose (paper), polyethylene with pores, or polypropylene with pores.

For an electrolyte in an electrolyte solution, a material containing carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone, or two or more of them may be used in an appropriate combination and in an appropriate ratio.

Note that when carrier ions are alkali metal ions other than lithium ions, or alkaline-earth metal ions, instead of lithium in the above lithium salts, an alkali metal (e.g., sodium and potassium), an alkaline-earth metal (e.g., calcium, strontium, barium, beryllium, and magnesium) may be used for the electrolyte.

For a solvent of the electrolyte solution, a material having the carrier ion mobility is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), γ-butyrolactone, dimethoxyethane, and tetrahydrofuran, and one or more of these materials can be used. When a gelled polymeric material is used for the solvent of the electrolyte solution, safety against liquid leakage and the like is improved. Furthermore, a thin and light storage battery can be fabricated. Typical examples of gelled polymeric materials include a silicone gel, an acrylic gel, an acrylonitrile gel, a polyethylene oxide-based gel, a polypropylene oxide-based gel, and a gel of a fluorine-based polymer. Alternatively, the use of one or more kinds of ionic liquids (room temperature molten salts) which have features of non-flammability and non-volatility for the solvent of the electrolyte solution can prevent the storage battery from exploding or catching fire even when the storage battery internally shorts out or the internal temperature increases because of overcharging and the like.

Instead of the electrolyte solution, a solid electrolyte including an inorganic material such as a sulfide-based inorganic material or an oxide-based inorganic material, or a solid electrolyte including a high-molecular material such as a polyethylene oxide (PEO)-based high-molecular material may be used. When the solid electrolyte is used, a separator and a spacer are not necessary. Furthermore, the battery can be entirely solidified; therefore, there is no possibility of liquid leakage and thus the safety of the battery is dramatically increased.

For the positive electrode can 301 and the negative electrode can 302, a metal having a corrosion-resistant property to an electrolyte solution, such as nickel, aluminum, or titanium, an alloy of such a metal, or an alloy of such a metal and another metal (e.g., stainless steel) can be used. Alternatively, the positive electrode can 301 and the negative electrode can 302 are preferably covered with nickel, aluminum, or the like in order to prevent corrosion due to the electrolyte solution. The positive electrode can 301 and the negative electrode can 302 are electrically connected to the positive electrode 304 and the negative electrode 307, respectively.

The negative electrode 307, the positive electrode 304, and the separator 310 are immersed in the electrolyte solution. Then, as illustrated in FIG. 2B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Here, a current flow in charging a battery is described with reference to FIG. 2C. When a battery using lithium is regarded as a closed circuit, lithium ions transfer and a current flows in the same direction. Note that in the battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" or a "plus electrode" and the negative electrode is referred to as a "negative electrode" or a "minus electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive (plus) electrode or a negative (minus) electrode.

Figure 2C:
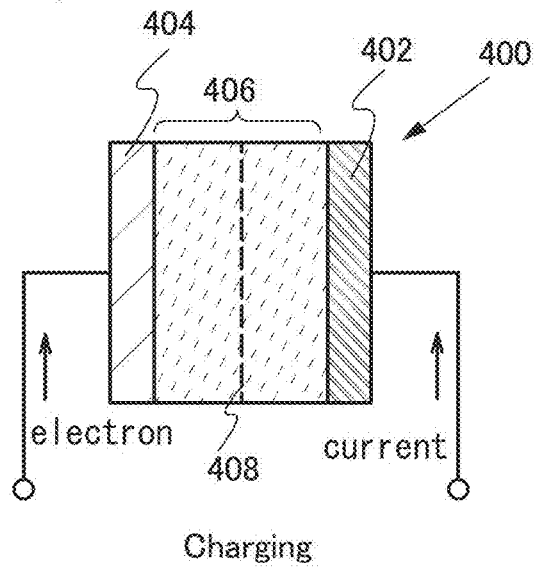

Two terminals in FIG. 2C are connected to a charger, and a storage battery 400 is charged. As the charge of the storage battery 400 proceeds, a potential difference between electrodes increases. In FIG. 2C, the positive direction is the direction in which a current flows from a terminal outside the storage battery 400 to a positive electrode 402, flows from the positive electrode 402 to a negative electrode 404 in the storage battery 400, and flows from the negative electrode to the other terminal outside the storage battery 400. In other words, a direction in which a charging current flows is regarded as a direction of a current.

[Cylindrical Storage Battery]

Figure 3A:
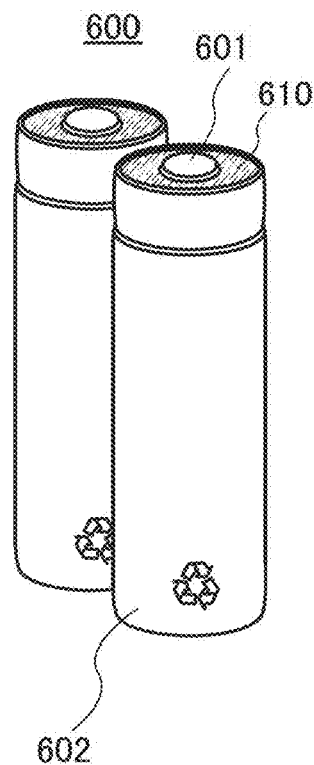
FIGS. 3A and 3B illustrate a cylindrical storage battery.

Next, an example of a cylindrical storage battery will be described with reference to FIGS. 3A and 3B. A cylindrical storage battery 600 includes, as illustrated in FIG. 3A, a positive electrode cap (battery lid) 601 on the top surface and a battery can (outer can) 602 on the side and bottom surfaces. The positive electrode cap and the battery can (outer can) 602 are insulated from each other by a gasket (insulating gasket) 610.

Figure 3B:
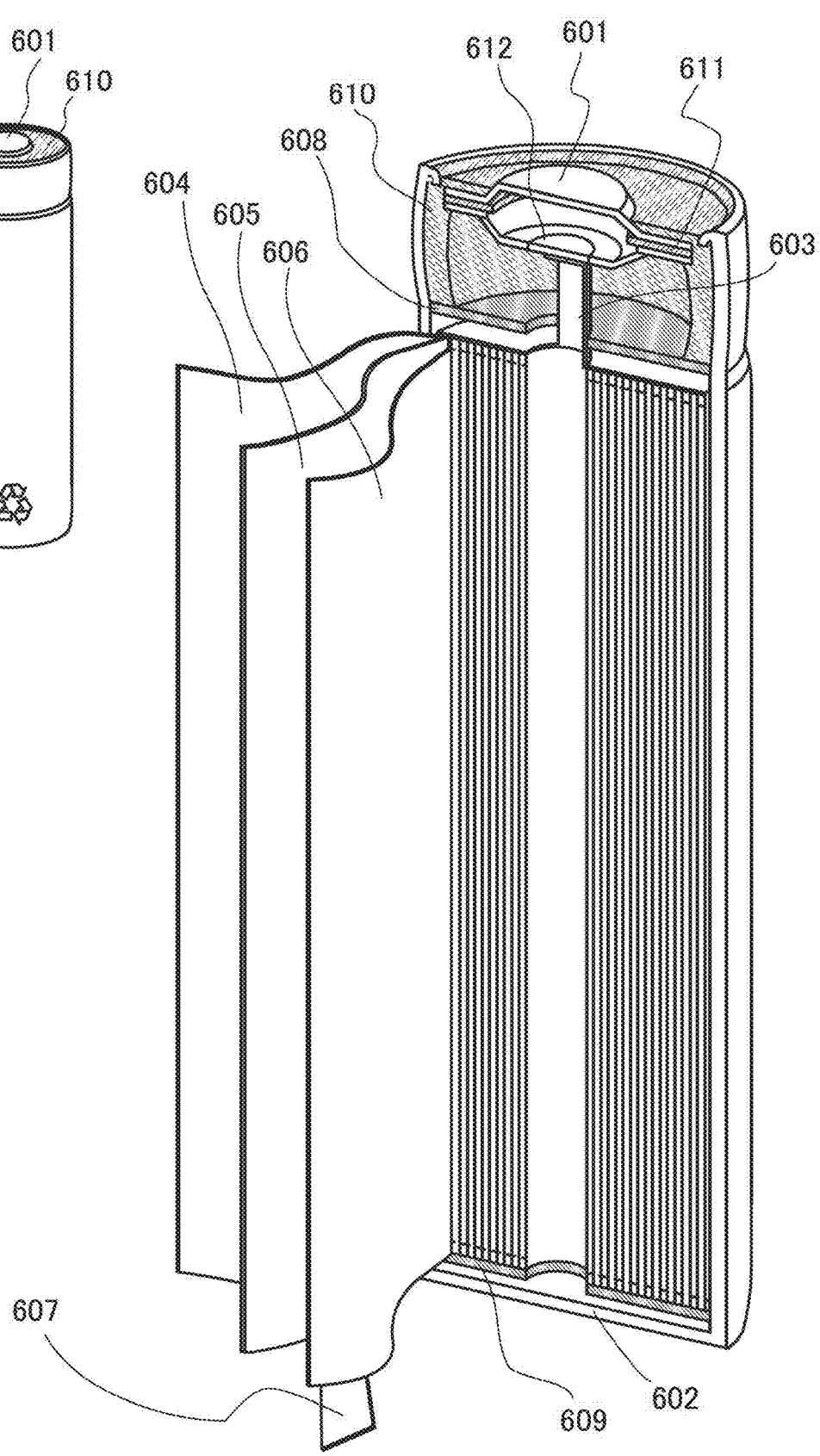

FIG. 3B is a schematic cross-sectional view of the cylindrical storage battery. Inside the battery can 602 having a hollow cylindrical shape, a battery element in which a strip-like positive electrode 604 and a strip-like negative electrode 606 are wound with a strip-like separator 605 interposed therebetween is provided. Although not illustrated, the battery element is wound around a center pin. One end of the battery can 602 is close and the other end thereof is open. For the battery can 602, a metal having a corrosion-resistant property to an electrolyte solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is provided between a pair of insulating plates 608 and 609 that face each other. Furthermore, a nonaqueous electrolyte solution (not illustrated) is injected inside the battery can 602 provided with the battery element. As the nonaqueous electrolyte solution, a nonaqueous electrolyte solution that is similar to that of the coin-type storage battery can be used.

Although the positive electrode 604 and the negative electrode 606 can be formed in a manner similar to that of the positive electrode and the negative electrode of the coin-type storage battery described above, the difference lies in that, since the positive electrode and the negative electrode of the cylindrical storage battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

[Laminated Storage Battery]

Next, an example of a laminated storage battery will be described with reference to FIG. 4A. When the laminated storage battery has flexibility and is used in an electronic device at least part of which is flexible, the storage battery can be bent as the electronic device is bent.

Figure 4A:
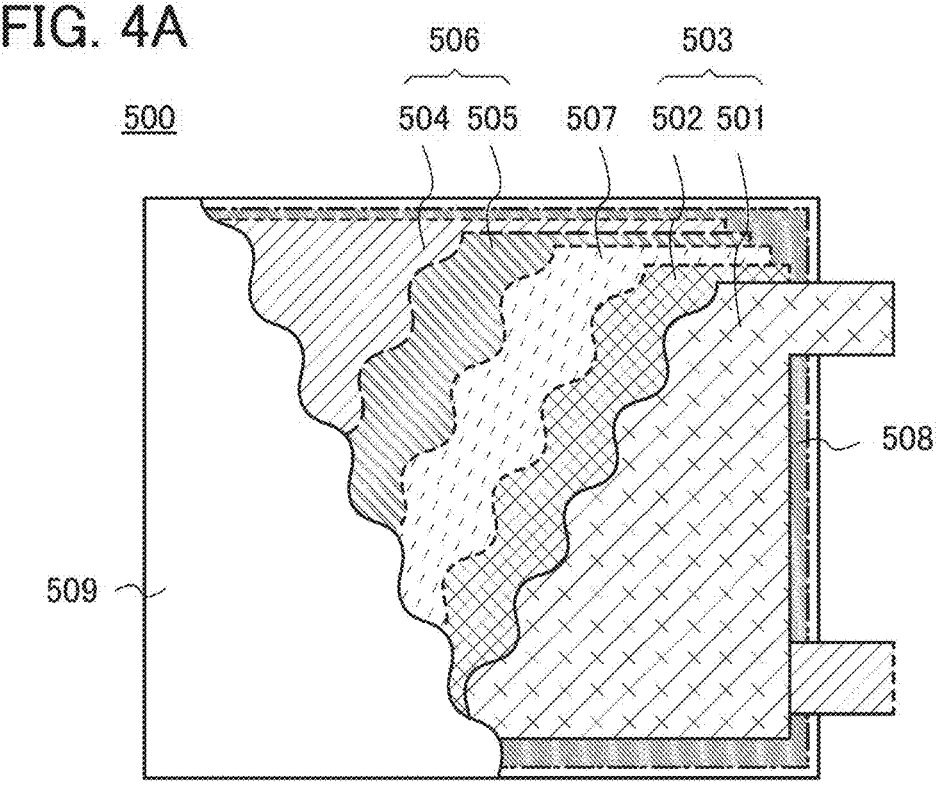
FIGS. 4A and 4B illustrate a laminated storage battery.

A laminated storage battery 500 illustrated in FIG. 4A includes a positive electrode 503 including a positive electrode current collector 501 and a positive electrode active material layer 502, a negative electrode 506 including a negative electrode current collector 504 and a negative electrode active material layer 505, a separator 507, an electrolyte solution 508, and an exterior body 509. The separator 507 is placed between the positive electrode 503 and the negative electrode 506, which are provided in the exterior body 509. The exterior body 509 is filled with the electrolyte solution 508. The positive electrode active materials described in Embodiment 1 can be used for the positive electrode active material layer 502.

In the laminated storage battery 500 illustrated in FIG. 4A, the positive electrode current collector 501 and the negative electrode current collector 504 also serve as terminals for an electrical contact with an external portion. For this reason, the positive electrode current collector 501 and the negative electrode current collector 504 may be arranged so as to be partly exposed to the outside of the exterior body 509. Alternatively, a lead electrode and the positive electrode current collector 501 or the negative electrode current collector 504 may be bonded to each other by ultrasonic welding, and instead of the positive electrode current collector 501 and the negative electrode current collector 504, the tab electrode may be exposed to the outside of the exterior body 509.

As the exterior body 509 in the laminated storage battery 500, for example, a laminate film having a three-layer structure can be employed in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided over the metal thin film as the outer surface of the exterior body.

Figure 4B:
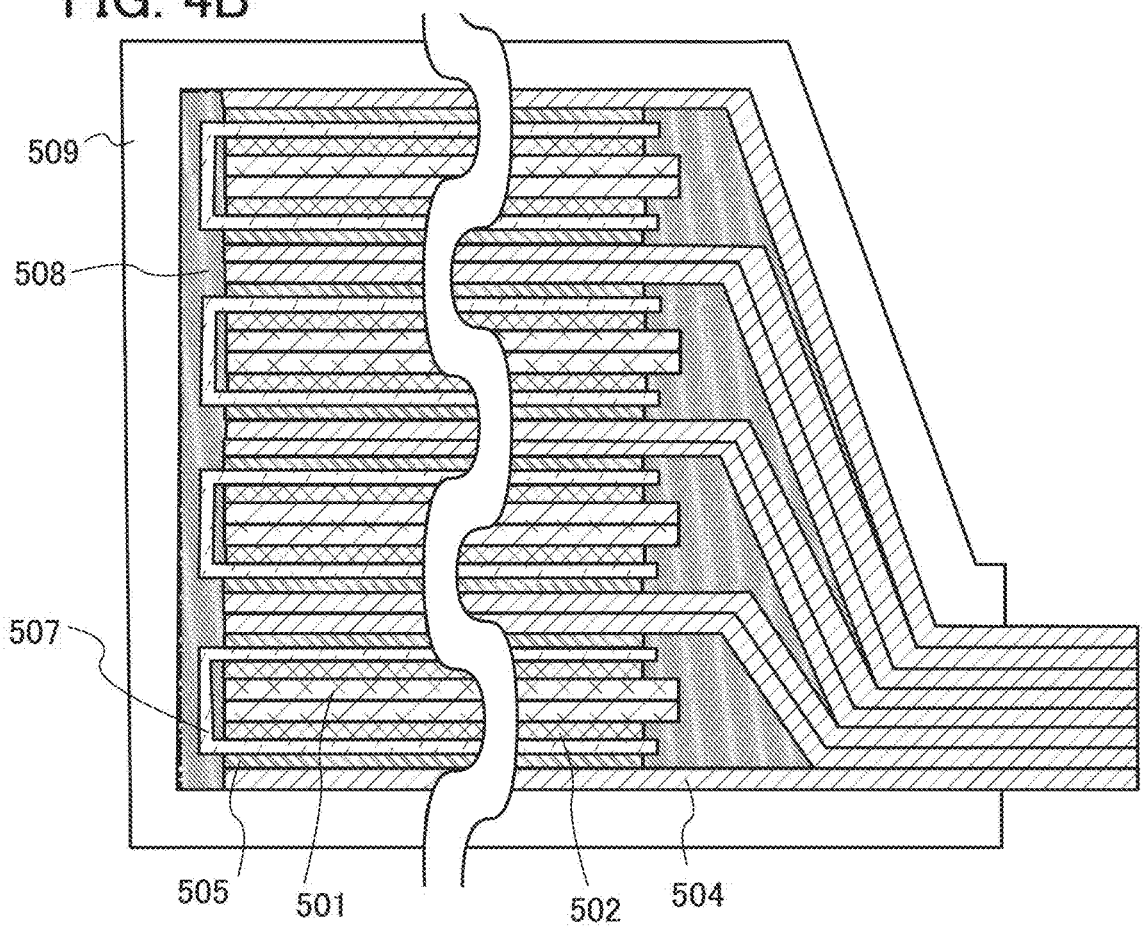

FIG. 4B illustrates an example of a cross-sectional structure of the laminated storage battery 500. Although FIG. 4A illustrates an example including only two current collectors for simplicity, an actual battery includes a plurality of electrode layers.

The example in FIG. 4B includes 16 electrode layers. The laminated storage battery 500 has flexibility even though including 16 electrode layers. FIG. 4B illustrates a structure including 8 layers of negative electrode current collectors 504 and 8 layers of positive electrode current collectors 501, i.e., 16 layers in total. Note that FIG. 4B illustrates a cross section of the lead portion of the negative electrode, and the 8 negative electrode current collectors 504 are bonded to each other by ultrasonic welding. It is needless to say that the number of electrode layers is not limited to 16, and may be more than 16 or less than 16. With a large number of electrode layers, the storage battery can have high capacity. In contrast, with a small number of electrode layers, the storage battery can have small thickness and high flexibility.

Embodiment 3

[Examples of Electrical Devices; Vehicles]

Described next are examples of vehicle including storage batteries. The use of storage batteries in vehicles enables production of next-generation clean energy vehicles such as hybrid electric vehicles (HEVs), electric vehicles (EVs), and plug-in hybrid electric vehicles (PHEVs).

Figure 5A:
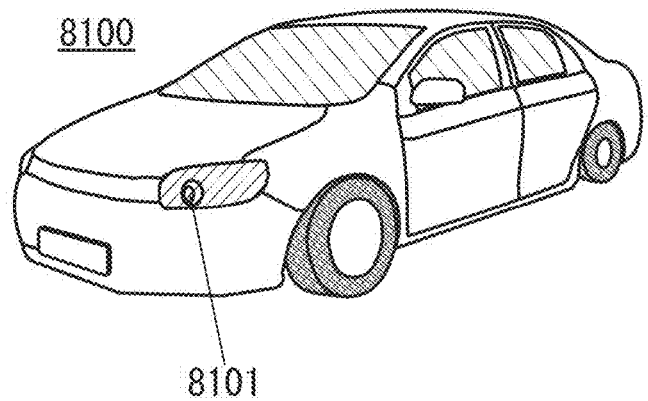
FIGS. 5A and 5B illustrate application modes of a power storage device.
Figure 5B:
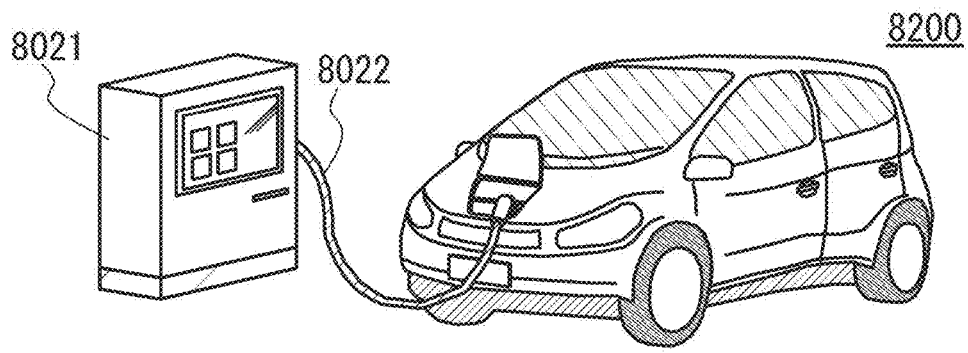

FIGS. 5A and 5B each illustrate an example of a vehicle fabricated using one embodiment of the present invention. An automobile 8100 illustrated in FIG. 5A is an electric vehicle that runs on the power of an electric motor. Alternatively, the automobile 8100 is a hybrid electric vehicle capable of driving using either an electric motor or an engine as appropriate. One embodiment of the present invention offers a vehicle including an inexpensive storage battery. The automobile 8100 includes a power storage device. The power storage device is used not only to drive the electric motor, but also to supply electric power to a light-emitting device such as a headlight 8101 or a room light (not illustrated).

The power storage device can also supply electric power to a display device of a speedometer, a tachometer, or the like included in the automobile 8100. Furthermore, the power storage device can supply electric power to a semiconductor device included in the automobile 8100, such as a navigation system.

FIG. 5B illustrates an automobile 8200 including a power storage device. The automobile 8200 can be charged when the power storage device is supplied with electric power through external charging equipment by a plug-in system, a contactless power feeding system, or the like. In FIG. 5B, the power storage device included in the automobile 8200 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. With the use of a plug-in technique, the power storage device included in the automobile 8200 can be charged by being supplied with electric power from outside. The charging can be performed by converting AC electric power into DC electric power through a converter such as an ACDC converter.

Although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle stops but also when moves. In addition, the contactless power feeding system may be utilized to perform transmission and reception of electric power between vehicles. A solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device fabricated at low costs contributes to a reduction in the costs of the vehicle.

This embodiment can be implemented in appropriate combination with the other embodiments.

Example 1

In this example, an example of a manufacturing method of expansion graphite will be described below.

To 1 ml of hydrogen peroxide solution ($H_2O_2$) with 31 wt %, 22.5 ml of concentrated sulfuric acid (96%) is gradually added and the mixture is stirred. To the mixture, 5 g of graphite powder is added and stirred for 1 hour at room temperature. In this example, flake graphite (F #1 manufactured by Nippon Graphite Industries, Co., Ltd.) with an average particle size of 500 µm is used as the graphite powder.

Then, concentrated sulfuric acid is removed as much as possible with a suction filtration apparatus, and washing is performed with a saturated aqueous solution of magnesium sulfate. Washing is performed not with pure water but with an aqueous solution containing a large amount of sulfuric acid ion, thereby preventing the release of sulfuric acid from graphite. Furthermore, sulfate prevents heat generation due to the mixture of water and concentrated sulfuric acid.

Figure 6:
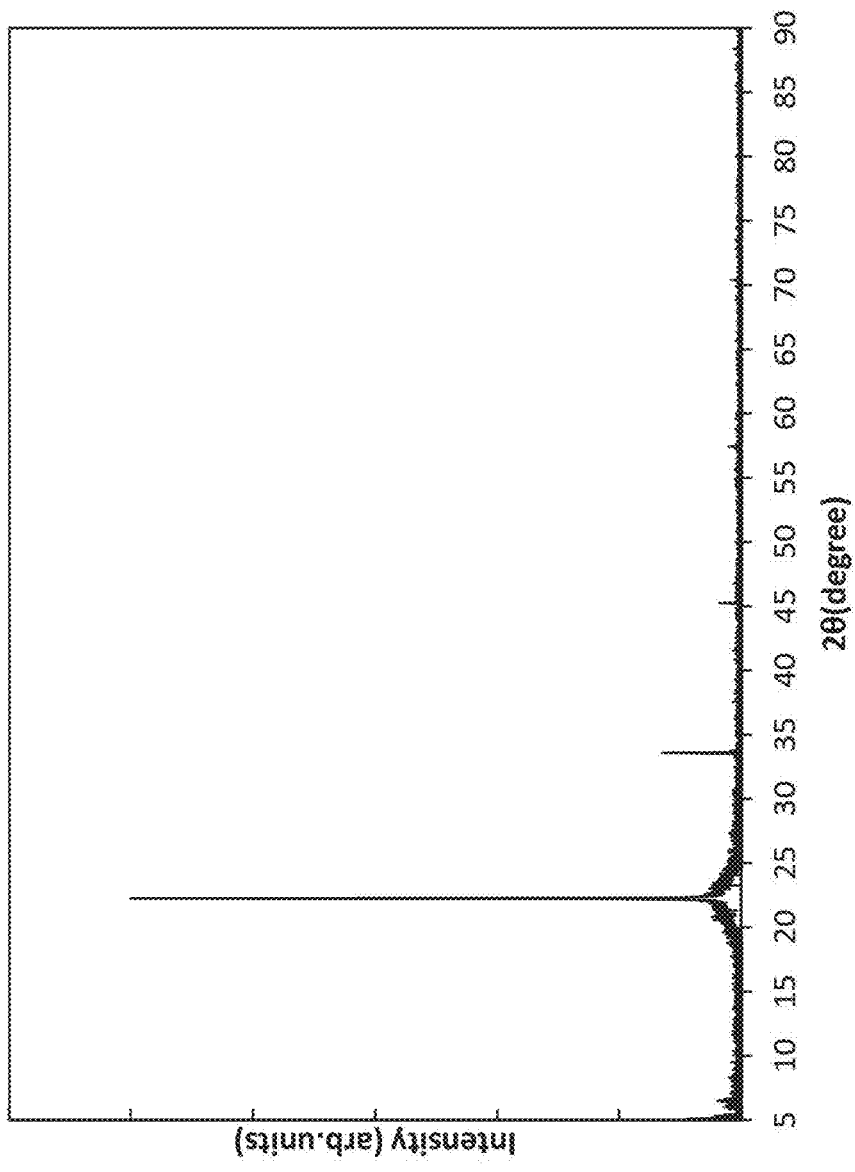
FIG. 6 is a graph showing XRD measurement results.
Figure 7:
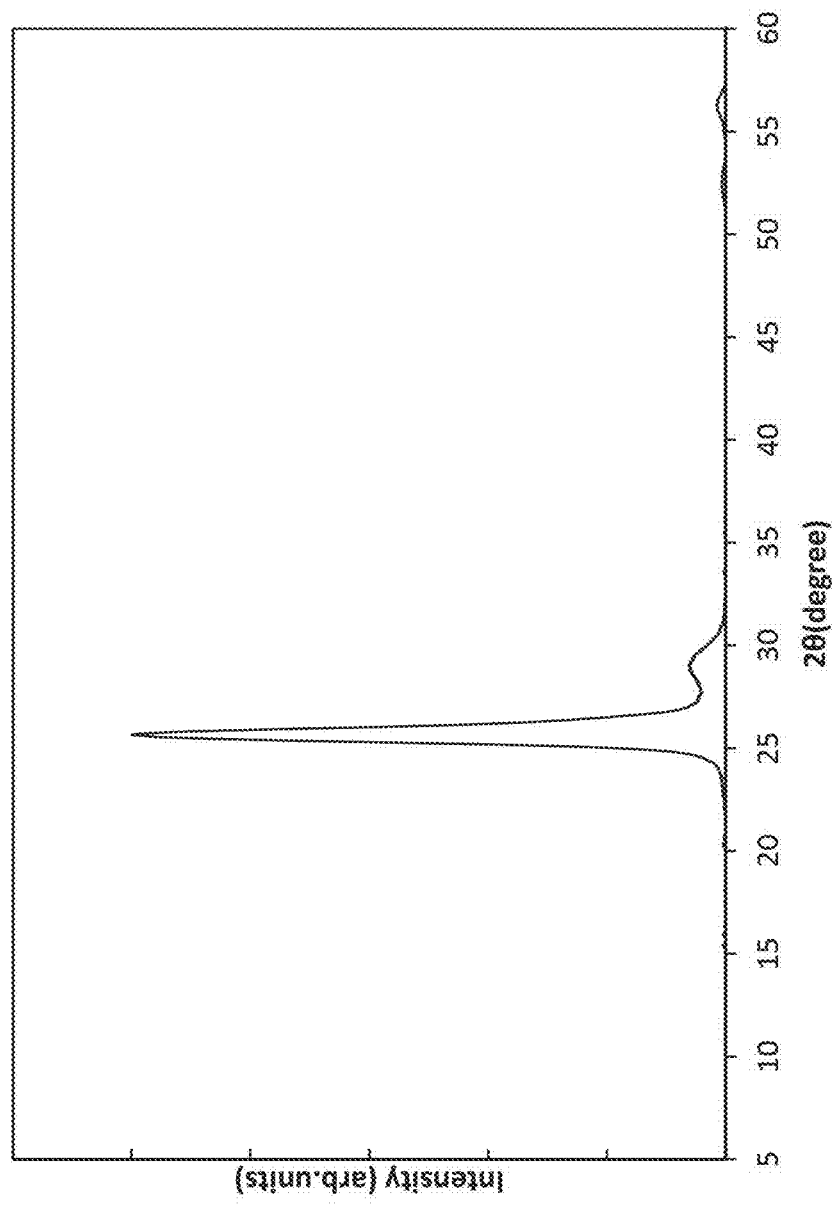
FIG. 7 is a graph showing XRD measurement results.

FIG. 6 shows the XRD measurement results of graphite before washing. As shown in FIG. 6, first-stage expansion graphite is obtained and the XRD spectrum suggests that the interlayer distance is approximately 8.02 angstroms. FIG. 7 shows the XRD measurement results of graphite that has been washed with a saturated aqueous solution of magnesium sulfate. As shown in FIG. 7, seventh-stage expansion graphite is obtained. The stage number indicates how many atoms and molecules are intercalated into a graphite interlayer compound. For example, the second-stage graphite refers to a substance in which sulfuric acid (or a sulfuric acid ion) is inserted in every two graphite layers. Hence, from graphite with a lower stage, a thinner graphite layer can be peeled after thermal expansion.

The obtained expansion graphite is dried at 80° C.

Subsequently, heat treatment is performed in an air atmosphere at 600° C. for longer than or equal to 1 hour and shorter than or equal to 2 hours, whereby expanded graphite is obtained. The heat treatment for obtaining expanded graphite may be microwave irradiation with a microwave oven. With a microwave oven (600 W), 10-second treatment is repeated twice to obtain expanded graphite.

After that, the expanded graphite is peeled by ultrasonic treatment at 25 kHz in ethanol, and oxidized to manufacture graphene oxide. In this manner, graphene oxide can be safely and efficiently mass-produced at low costs.

Figure 8:
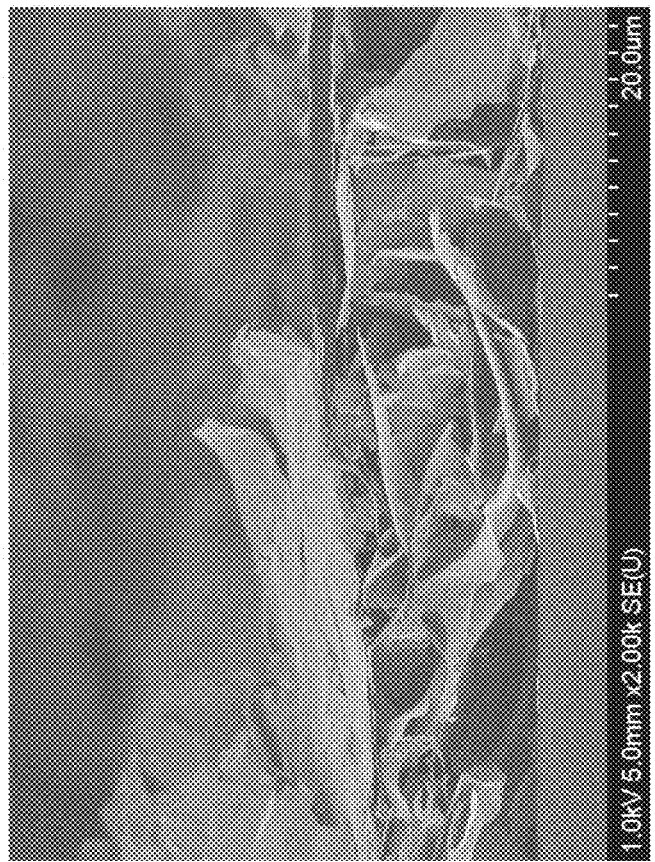
FIG. 8 is a cross-sectional SEM photograph of expansion graphite.

Note that to observe the expanded graphite immediately after the microwave irradiation with the microwave oven, 0.05 g of expanded graphite is extracted and subjected to ultrasonic treatment at 25 kHz in ethanol (10 mL) for approximately 10 minutes. FIG. 8 is a photograph of the SEM observation.

Example 2

In this example, an example of using an organic solvent instead of a saturated aqueous solution of magnesium sulfate will be described below.

In order to prevent the reduction of graphite that has been oxidized, γ-butyrolactone is used as an organic solvent in washing.

This example is different from Example 1 only in the liquid used in washing; thus, the description is omitted.

FIG. 9 shows the XRD measurement results of graphite that has been washed. The XRD spectrum suggests that the interlayer distance is approximately 8 angstroms. As shown in FIG. 9, third-stage or fourth-stage expansion graphite is obtained.

Subsequently, heat treatment is performed in an air atmosphere for longer than or equal to 1 hour and shorter than or equal to 2 hours, whereby expanded graphite is obtained. The heat treatment for obtaining expanded graphite may be microwave irradiation with a microwave oven. After that, the expanded graphite is peeled by ultrasonic treatment at 25 kHz in ethanol (approximately 10 minutes), and oxidized to manufacture graphene oxide. In this manner, graphene oxide can be safely and efficiently mass-produced at low costs.

This application is based on Japanese Patent Application serial No. 2015-250970 filed with Japan Patent Office on Dec. 24, 2015, the entire contents of which are hereby incorporated by reference.

What is claimed is:

1. A method for manufacturing a graphene compound, comprising steps of:

adding graphite into solution including sulfuric acid;

washing the graphite with an aqueous solution containing sulfate or an organic solvent after adding;

forming expanded graphite from the graphite after washing; and performing ultrasonic treatment on the expanded graphite.

2. The method for manufacturing a graphene compound according to claim 1, wherein, in the step of the ultrasonic treatment, the expanded graphite is dispersed in a dispersed medium.

3. The method for manufacturing a graphene compound according to claim 2, wherein the dispersed medium is ethanol.

4. The method for manufacturing a graphene compound according to claim 1, wherein the expanded graphite is formed by heat treatment or microwave irradiation.

5. The method for manufacturing a graphene compound according to claim 1, wherein the graphite is flake graphite.

6. The method for manufacturing a graphene compound according to claim 1, wherein the sulfate is magnesium sulfate, potassium sulfate, or titanium sulfate.

7. The method for manufacturing a graphene compound according to claim 1, wherein the aqueous solution containing sulfate is a saturated aqueous solution of magnesium sulfate, a saturated aqueous solution of potassium sulfate, or a saturated aqueous solution of titanium sulfate.

8. The method for manufacturing a graphene compound according to claim 1, wherein the organic solvent is γ-butyrolactone.

9. A method for manufacturing a secondary battery, comprising the steps of:

adding graphite into solution including sulfuric acid;

washing the graphite with an aqueous solution containing sulfate or an organic solvent after adding;

forming expanded graphite from the graphite after washing;

performing ultrasonic treatment on the expanded graphite to form graphene oxide;

mixing the graphene oxide with an active material to form a paste;

applying the paste on a current collector to form a first electrode; and overlapping the first electrode and a second electrode with a separator positioned therebetween.

10. The method for manufacturing a secondary battery according to claim 9, wherein, in the step of the ultrasonic treatment, the expanded graphite is dispersed in a dispersed medium.

11. The method for manufacturing a secondary battery according to claim 10, wherein the dispersed medium is ethanol.

12. The method for manufacturing a secondary battery according to claim 9, wherein the expanded graphite is formed by heat treatment or microwave irradiation.

13. The method for manufacturing a secondary battery according to claim 9, wherein the graphite is flake graphite.

14. The method for manufacturing a secondary battery according to claim 9, wherein the sulfate is magnesium sulfate, potassium sulfate, or titanium sulfate.

15. The method for manufacturing a secondary battery according to claim 9, wherein the aqueous solution containing sulfate is a saturated aqueous solution of magnesium sulfate, a saturated aqueous solution of potassium sulfate, or a saturated aqueous solution of titanium sulfate.

16. The method for manufacturing a secondary battery according to claim 9, wherein the organic solvent is γ-butyrolactone.

* * * * *